United States Patent [19]

Kamono et al.

[11] Patent Number: 5,150,021
[45] Date of Patent: Sep. 22, 1992

[54] METHOD OF CONTROLLING ELECTRIC POWER STEERING APPARATUS

[75] Inventors: Shinobu Kamono; Masayuki Shimura; Tomoyuki Ishii, all of Saitama, Japan

[73] Assignee: Jidosha Kiki Co., Ltd., Tokyo, Japan

[21] Appl. No.: 831,612

[22] Filed: Feb. 5, 1992

Related U.S. Application Data

[63] Continuation of Ser. No. 583,600, Sep. 17, 1990, abandoned.

[30] Foreign Application Priority Data

Sep. 18, 1989 [JP] Japan ................... 1-240194

[51] Int. Cl.$^5$ ............................................. B62D 5/04
[52] U.S. Cl. .......................................... 318/488; 318/2; 318/489; 180/79.1
[58] Field of Search ................... 318/2, 488, 489, 675, 318/432, 433, 434, 504; 180/79.1, 141, 142; 364/424.05

[56] References Cited

U.S. PATENT DOCUMENTS

| | | | |
|---|---|---|---|
| 4,686,433 | 8/1987 | Shimizu | 318/50 |
| 4,756,375 | 7/1988 | Ishikura et al. | 180/79.1 |
| 4,756,376 | 7/1988 | Shimizu | 180/79.1 |
| 4,855,655 | 8/1989 | Shimizu | 388/820 |
| 4,943,758 | 7/1990 | Tsurumiya | 318/504 |
| 4,972,133 | 11/1990 | Hirota et al. | 318/646 |
| 4,972,320 | 11/1990 | Sugiura et al. | 364/424.05 |
| 4,977,507 | 12/1990 | Matsuoka et al. | 364/424.05 |
| 4,989,683 | 2/1991 | Morishita | 180/79.1 |
| 4,992,944 | 2/1991 | Noto et al. | 180/79.1 X |
| 5,027,276 | 6/1991 | Morishita et al. | 180/79.1 X |
| 5,040,630 | 8/1991 | Morishita et al. | 180/79.1 |

*Primary Examiner*—Bentsu Ro
*Attorney, Agent, or Firm*—Blakely Sokoloff Taylor & Zafman

[57] ABSTRACT

A method of controlling an electric power steering apparatus includes the steps of determining a steering state in accordance with a detection value and a retrieval value of a motor terminal across voltage, and limiting a motor current when a steering wheel held state is determined as the steering state determination result and a motor current value in the steering wheel held state is a predetermined value or more.

2 Claims, 5 Drawing Sheets

METHOD OF CONTROLLING ELECTRIC POWER STEERING APPARATUS

This is a continuation of application Ser. No. 583,600, filed Sep. 17, 1990, now abandoned.

BACKGROUND OF THE INVENTION

The present invention relates to a method of controlling a full-electric power steering apparatus and, more particularly, to a method of determining an overload.

In a conventional overload determining method, an overload is determined when a motor current exceeds a predetermined value throughout the entire region of a steering wheel (a region from a left maximum angle to a right maximum angle of the steering wheel), and a current value is limited when an overload determined state continues over a predetermined time period. The current value is limited in order to protect a transistor for driving a motor from thermal destruction. In this case, an overload is a state wherein a motor current exceeds 38 A, and a limited current value is, e.g., 15 A when an overload state continues over a predetermined time period.

As described above, in conventional overload determination, a determination method is unchanged throughout the entire region of a steering wheel. Therefore, a current value is limited in a stopper region of a steering wheel (i.e., at the left and right maximum angles of the steering wheel and a region close thereto) when an overload state continues over a predetermined time period, thereby effectively protecting the transistor for driving a motor from thermal destruction as described above. The current value, however, is similarly limited in a normal region of a steering wheel (a region of the steering wheel except for the above stopper region). As a result, a steering wheel becomes heavy even while it is operated.

Therefore, a method in which a predetermined time period for determining the overload state is properly set so as not to limit a current in the normal region is proposed on the basis of the fact that the overload state continues for a long time period in the stopper region of a steering wheel but does not continue for long in its normal region. Since, however, this method has a problem in its correctness in operation, current limitation cannot be correctly prevented in the normal region.

SUMMARY OF THE INVENTION

The present invention has been made in consideration of the above situation, and has as its object to provide a method of controlling an electric power steering apparatus, which can reliably perform current limitation in a stopper region of a steering wheel and prevent current limitation in its normal region.

In order to achieve the above object of the present invention, there is provided a method of controlling an electric power steering apparatus, comprising the steps of determining a steering state in accordance with a detection value and a retrieval value of a voltage across a motor, and limiting a motor current when a steering wheel held state is determined as the steering state determination result and a motor current value in the steering wheel held state is a predetermined value or more.

The method of controlling an electric power steering apparatus according to the present invention checks a steering state and determines an overload only when a steering wheel held state is determined and a motor current or a duty ratio of motor driving exceeds a predetermined set value.

DETAILED DESCRIPTION OF THE PREFERRED EMBODIMENT

An embodiment of the present invention will be described in detail below with reference to the accompanying drawings.

Figure 5:
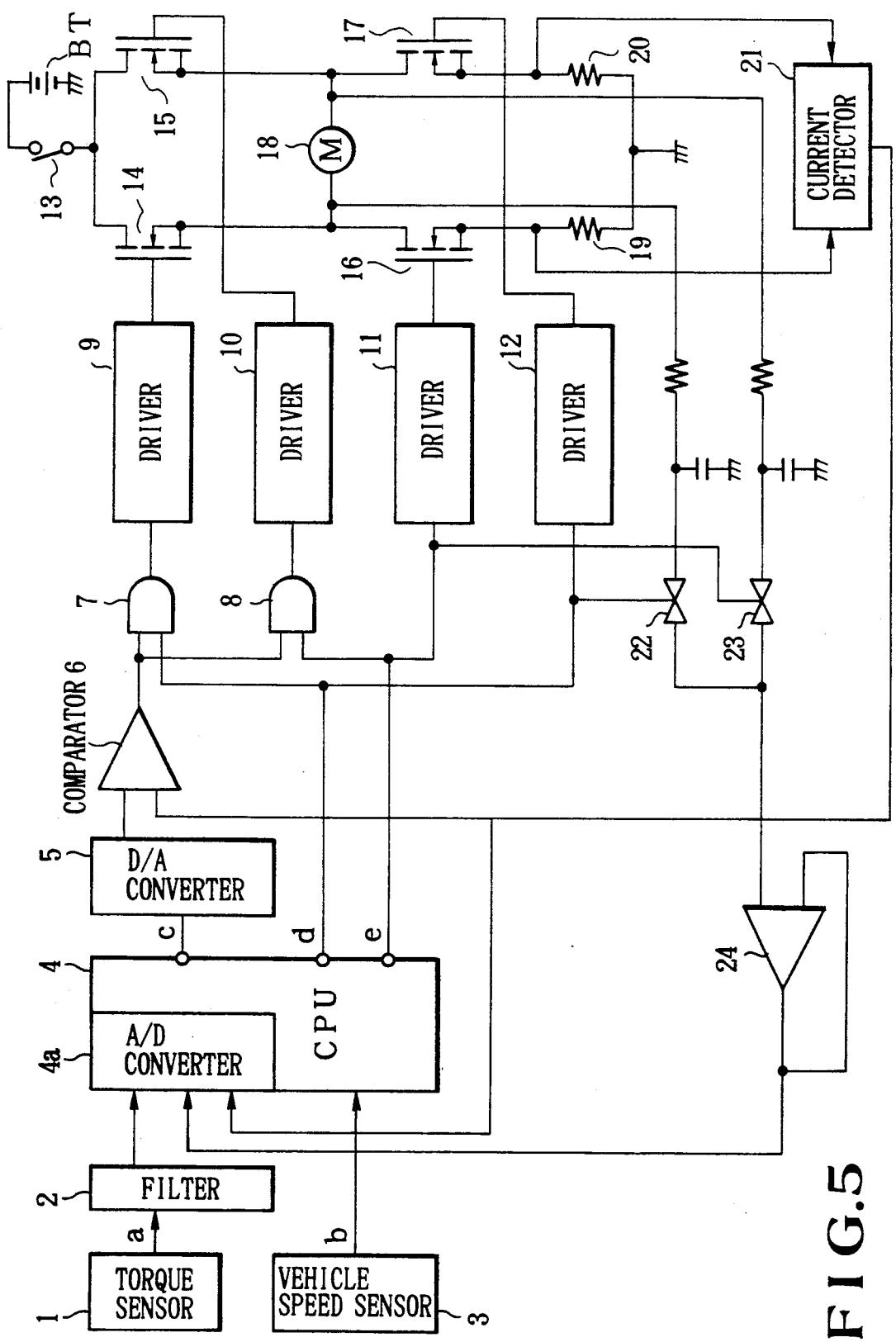
FIG. 5 is a circuit diagram showing an assisting motor driving control circuit.

FIG. 5 shows an assisting motor driving control circuit of a general full-electric power steering apparatus. Referring to FIG. 5, reference numeral 1 denotes a torque sensor for outputting a torque signal a; 2, a filter for removing noise from the torque signal a; 3, a vehicle speed sensor for outputting a vehicle speed signal b; 4, a CPU for controlling the entire circuit; 4a, an A/D converter of the CPU 4; 5, a D/A converter connected to the output side of the CPU 4; 6, a comparator; 7 and 8, AND gates; 9 to 12, drivers; 13, a power switching means such as a relay; 14 to 17, transistors connected to the drivers 9 to 12; 18, an assisting motor; 19 and 20, resistors for motor current detection; 21, a current detector; 22 and 23, analog switches; 24, a buffer; and BT, a battery.

A general operation of the circuit shown in FIG. 5 will be described below. That is, the torque signal a is input to the A/D converter 4a of the CPU 4, and the vehicle speed signal b is input directly to the CPU 4. On the basis of the signals a and b, the CPU 4 outputs a drive current value c as a command value to the D/A converter 5 and outputs a right signal d and a left signal e for determining a rotational direction of the motor. The analog drive current value output from the D/A converter 5 is compared with a motor current value from the current detector 21 by the comparator 6. If the drive current value is larger than the motor current value, "1" is output to the AND gates 7 and 8. If the drive current value is smaller than the motor current value, "0" is output to the AND gates 7 and 8. Assume that the CPU 4 outputs the right signal d of "1" and the left signal e of "0". In this case, if the drive current value is larger than the motor current value, the AND gate 7 outputs a signal of "1", and the driver 9 drives the transistor 14. In addition, the driver 12 receives the right signal d directly from the CPU 4 to drive the transistor 17. Therefore, a left-to-right current flows through the motor 18, and the motor 18 rotates clockwise. If the drive current value is smaller than the motor current value or both the right and left signals d and e are "0", no transistor is driven.

Note that upon clockwise rotation, the analog switch 22 is turned on to supply a voltage at the left terminal of the motor 18 to the CPU 4 via the buffer 24. At this time, a voltage at the right terminal of the motor 18 is substantially close to a body potential of a vehicle. Therefore, the voltage at the left terminal of the motor 18 is substantially a voltage across the motor. Upon counterclockwise rotation, the analog switch 23 is turned on to perform a similar operation.

An embodiment of the present invention will be described below with reference to FIGS. 1, 2, 3, 5, and FIGS. 6A to 6D. When an ignition key switch is turned on, power is supplied to the assisting motor driving control circuit shown in FIG. 5, initialization is performed by "memory clear" and the like in the CPU 4, and initial diagnosis is performed to check abnormality in the relay, the motor, or the like (steps 31 and 32). Note that in this initialization, an overload flag F is set to be "0".

An overload is checked (step 33). Since overload flag F=0 in an initial period, the flow advances to step 34 to detect a steering wheel torque (step 34). A motor current designation value is calculated from the steering wheel torque and a vehicle speed (step 35).

Figure 6A:
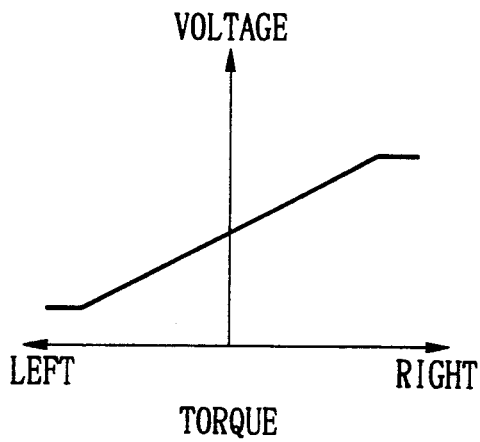
FIGS. 6A to 6D are graphs showing various types of maps stored in an internal memory of a CPU shown in FIG. 5.
Figure 6B:
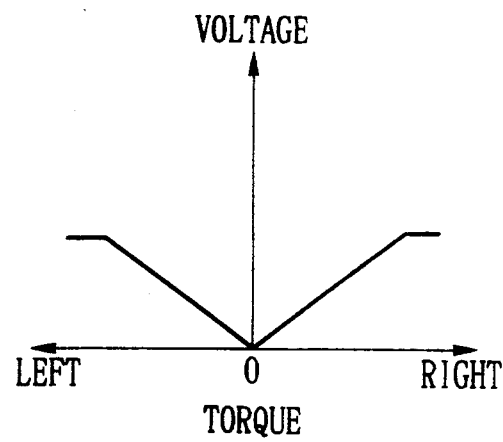
Figure 6C:
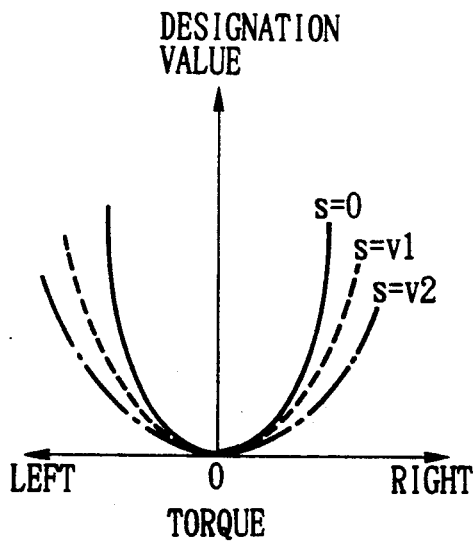

A method of calculating the motor current designation value will be described below. The direction of a torque is determined on the basis of a voltage value of the torque signal a shown in FIG. 5. More specifically, the direction can be determined on the basis of a voltage map of the CPU 4 as shown in FIG. 6A in which the abscissa indicates the torque and the ordinate indicates the voltage. A torque value T is calculated on the basis of a symmetrical torque calculation map as shown in FIG. 6B, and a vehicle speed s is calculated from the vehicle speed signal b. Thereafter, the designation value is calculated on the basis of a designation value (drive current value) vs. torque map having the vehicle speed s as a parameter as shown in FIG. 6C.

In this manner, the motor current designation value and the direction are output to the motor 18 (step 36). As a result, a current is flowed to the motor 18, and the motor 18 starts rotation. A voltage $V_M$ across the motor 18 at this time is detected to determine a steering state (step 37). After the steering state is determined, overload determination is performed (step 38), and the flow returns to step 33. If an overload is determined in step 33 (if overload flag F=1), the flow advances to step 39 to perform current limitation.

Figure 1:
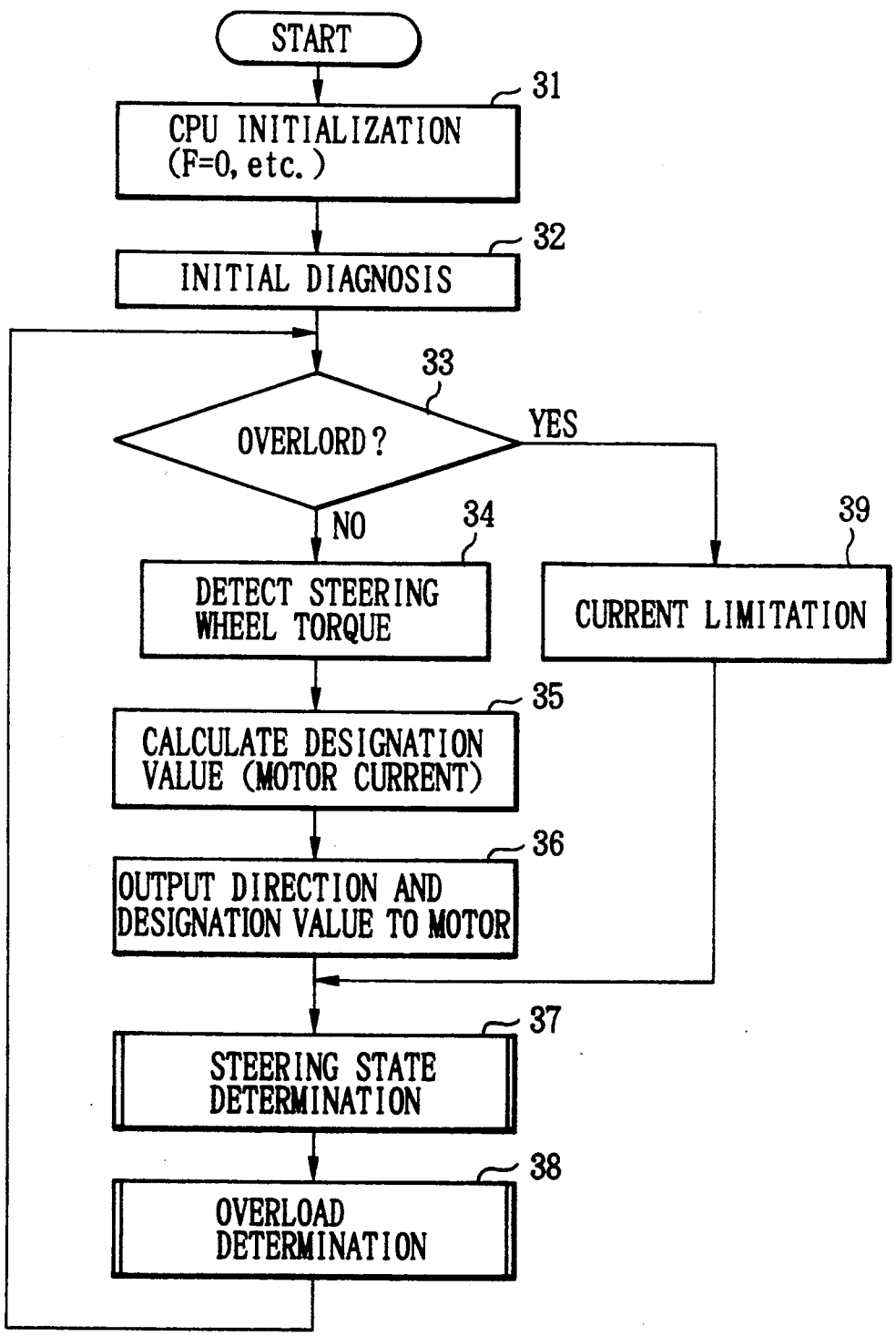
FIGS. 1, 2, 3, and 4 are flow charts for explaining an embodiment of a method of controlling an electric power steering apparatus according to the present invention.
Figure 2:
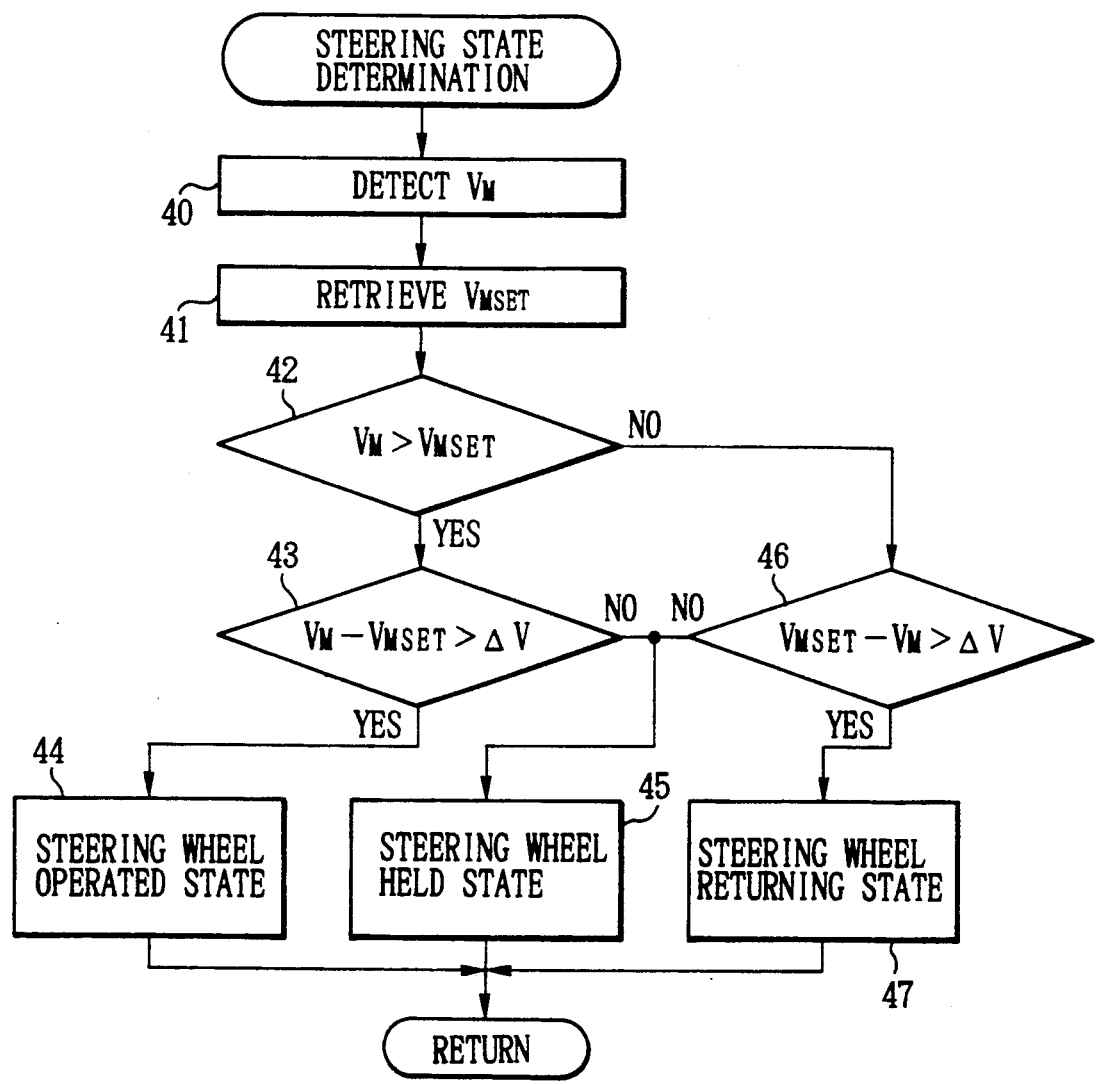
Figure 6D:
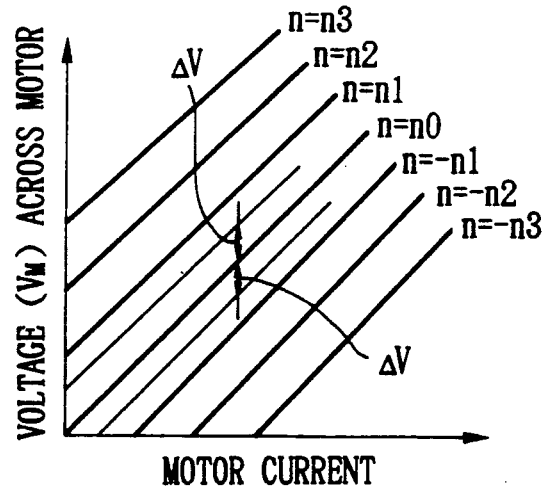

The above steering state determination will be described below with reference to a steering state determination flow chart shown in FIG. 2. First, the voltage $V_M$ (detection value) across the motor 18 is detected (step 40). This voltage in a steering wheel held state with respect to the motor current designation value (step 35) obtained in FIG. 1, i.e., a retrieval voltage $V_{MSET}$ (retrieval value) is obtained (step 41). The retrieval voltage $V_{MSET}$ can be obtained on the basis n=0 of voltage across the motor vs. motor current characteristic curves shown in FIG. 6D. Referring to FIG. 6D, reference symbol n denotes a parameter of motor rotational speed. Characteristic curves of n=n1, n2, and n3 indicate characteristics obtained when a clockwise drive current is flowed to rotate the motor clockwise, and characteristic curves of n=−n1, −n2, and −n3 indicate characteristics obtained when a counterclockwise drive current is flowed to rotate the motor counterclockwise.

The voltages $V_M$ and $V_{MSET}$ are compared with each other. If $V_M$ is higher than $V_{MSET}$, a value of $V_M-V_{MSET}$ is obtained (steps 42 and 43). If the value of $V_M-V_{MSET}$ is larger than $\Delta V$, a steering wheel operated state is determined (step 44). If the value of $V_M-V_{MSET}$ is smaller than $\Delta V$, a steering wheel held state is determined (step 45). In this case, $\Delta V$ is a predetermined allowable value as shown in FIG. 6D for preventing an erroneous operation caused by offset, noise, or the like. If $V_M$ is smaller than $V_{MSET}$ in step 42, a value of $V_{MSET}-V_M$ is obtained (step 46). If the value of $V_{MSET}-V_M$ is larger than $\Delta V$, a steering wheel returning state is determined (step 47). If the value of $V_{MSET}-V_M$ is smaller than $\Delta V$, a steering wheel held state is determined (step 45).

Figure 3:
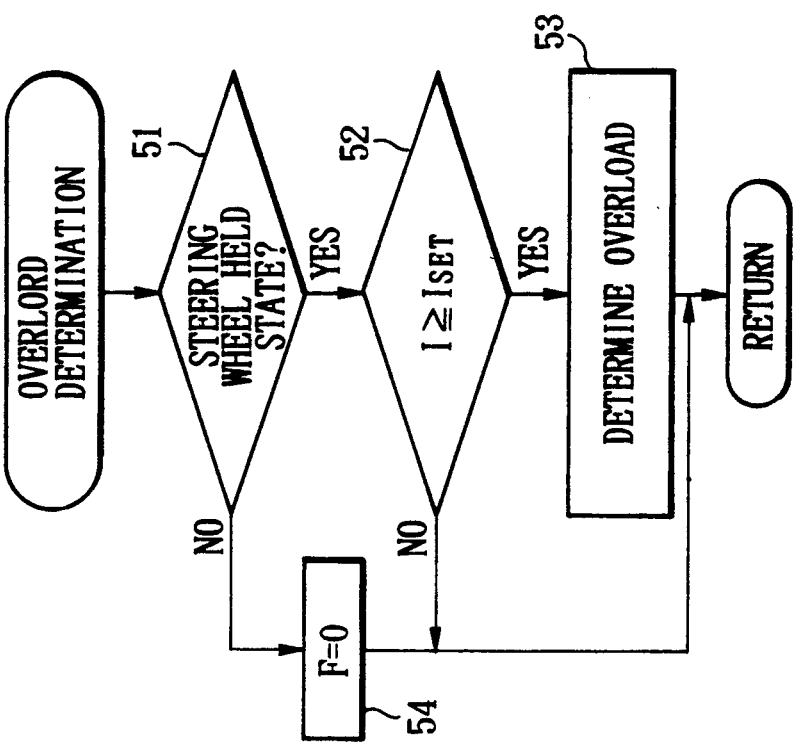

The above overload determination will be described below with reference to FIG. 3. First, a steering wheel held state is checked (step 51). This determination is performed by using the steering state determination result obtained in step 37. If the steering wheel held state is determined in step 51, whether a motor current I exceeds a predetermined set value $I_{SET}$ (step 52). If $I \geq I_{SET}$ in step 52, an overload is determined (step 53). If the steering wheel held state is not determined in step 51, the overload flag F is reset, and the flow returns to step 33 shown in FIG. 1. In addition, if $I \geq I_{SET}$ is not established in step 52, the flow similarly returns to step 33 in FIG. 1. In this manner, when a steering wheel held state is determined and the condition of $I \geq I_{SET}$ is established even once, the flow advances from step 33 to "current limitation" in step 39 in FIG. 1, thereby limiting a current as long as the steering wheel held state is determined. Conditions of both the steering wheel held state and $I \geq I_{SET}$ are satisfied not in a normal region of a steering wheel but in only its stopper region. In addition, even if a current is not limited in the normal region, since an overload state in the normal region is instantaneous, a transistor for motor driving is not thermally destroyed.

Figure 4:
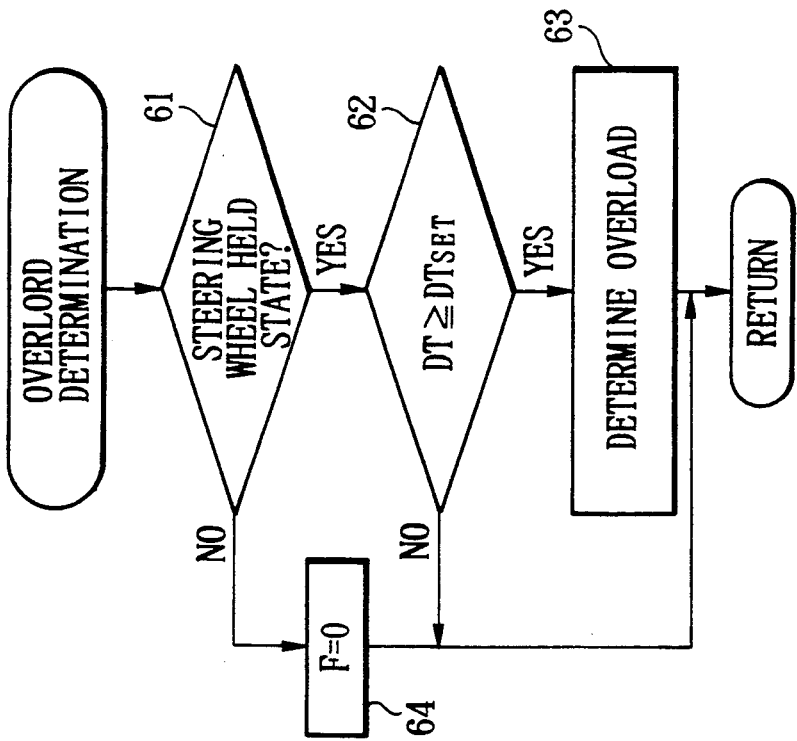

Another method of overload determination will be described below with reference to FIG. 4. In the overload determination shown in FIG. 4, steps 61, 63, and 64 are similar to steps 51, 53, and 54 in the overload determination shown in FIG. 3, and step 62 in which a duty ratio is used instead of a motor current is different from the determination in FIG. 3. Therefore, only step 62 will be described below. In step 62, a duty ratio designation value DT and a predetermined set value $DT_{SET}$ of the duty are compared with each other. If $DT \geq DT_{SET}$ is determined in a steering wheel held state, an overload is determined. If $DT \geq DT_{SET}$ is not determined, the flow returns to step 33 in FIG. 1.

As has been described above, according to the present invention, a steering state is determined in accordance with a detection value and a retrieval value of a voltage across a motor, and a motor current is limited when a steering wheel held state is determined as the steering state determination result and a motor current value is a predetermined set value or more in this state or when a duty ratio of motor driving is a predetermined set value or more in the steering wheel held state. Therefore, since current limitation in a stopper region of a steering wheel and prevention of current limitation in its normal region can be reliably performed, a steering wheel can be effectively prevented from being heavy in the normal region.

What is claimed is:

1. A method of controlling an electric power steering apparatus, comprising the steps of:
   detecting a value of a motor terminal across voltage in steering operation;
   comparing the detection value with a retrieval value of a motor terminal across voltage n a steering wheel held state to produce a steering state determination result having the steering wheel held state; and limiting a motor current when said steering wheel held state is determined according to the steering state determination result, and a motor current value in the steering wheel held state is not less than a predetermined set value.

2. A method of controlling an electric power steering apparatus, comprising the steps of:

detecting a detection value of a motor terminal across voltage in steering operation;

comparing the detection value with a retrieval value of a motor terminal across voltage in a steering wheel held state to produce a steering state determination result having the steering wheel held state; and limiting a motor current when said steering wheel held state is determined according to the steering state determination result and a duty ratio of motor driving in the steering wheel held state is not less than a predetermined set value.

* * * * *

UNITED STATES PATENT AND TRADEMARK OFFICE
CERTIFICATE OF CORRECTION

PATENT NO.  : 5,150,021
DATED       : September 22, 1992
INVENTOR(S) : Kamono et al.

It is certified that error appears in the above-identified patent and that said Letters Patent is hereby corrected as shown below:

In claim 1 in column 4 at line 65 replace "voltage n" with --voltage in--

Signed and Sealed this

Twelfth Day of September, 1995

Attest:

BRUCE LEHMAN

Attesting Officer

Commissioner of Patents and Trademarks